(12) United States Patent
Storrs

(10) Patent No.: US 7,258,321 B1
(45) Date of Patent: Aug. 21, 2007

(54) LAPTOP SUPPORT ASSEMBLY

(76) Inventor: William P. Storrs, 1008 Judy St., Fort Worth, TX (US) 76108

( * ) Notice: Subject to any disclaimer, the term of this patent is extended or adjusted under 35 U.S.C. 154(b) by 116 days.

(21) Appl. No.: 11/280,800

(22) Filed: Nov. 17, 2005

(51) Int. Cl.
*A47K 1/04* (2006.01)
*G06F 1/16* (2006.01)

(52) U.S. Cl. .................................... 248/918; 361/683
(58) Field of Classification Search ................ 248/918
See application file for complete search history.

(56) References Cited

U.S. PATENT DOCUMENTS

| | | | |
|---|---|---|---|
| 1,601,997 A | 10/1926 | Coss et al. | |
| 2,808,908 A * | 10/1957 | Lyon | 188/264 R |
| 2,810,231 A * | 10/1957 | Lykes | 248/451 |
| 3,894,709 A | 7/1975 | Weir | |
| D312,928 S | 12/1990 | Scheffers | |
| 4,978,096 A * | 12/1990 | Struckmann | 248/451 |
| D398,458 S | 9/1998 | Martell | |
| 5,971,343 A | 10/1999 | Marlak | |
| 6,021,535 A | 2/2000 | Baus et al. | |
| 2005/0263666 A1 * | 12/2005 | Kim | 248/445 |
| 2006/0022096 A1 * | 2/2006 | Chan et al. | 248/129 |

* cited by examiner

*Primary Examiner*—Lynn Feild
*Assistant Examiner*—Anthony Q. Edwards

(57) ABSTRACT

A laptop support assembly includes a pair of elongated bases each having a top side, a bottom side, a first end and a second end. A pair of supports is provided. Each of the supports is attached to one of the bases and extends upwardly therefrom. A panel is attached to and extends between the supports. A front side of the panel has a plurality of apertures extending therethrough. Each of a pair of clips is selectively positionable in one of the apertures. Each of a pair of rods includes a loop attached thereto. The rods are each extendable through of the apertures. A tether has a pair of ends terminating with hooks. Each of the hooks is releasably securable to one of the loops. A laptop computer is positionable on the clips and the tether positioned across the laptop computer to secure the laptop to the panel.

7 Claims, 4 Drawing Sheets

LAPTOP SUPPORT ASSEMBLY

BACKGROUND OF THE INVENTION

1. Field of the Invention

The present invention relates to laptop support devices and more particularly pertains to a new laptop support device for supporting a laptop computer in a vertical, or beyond vertical, orientation so that the laptop computer may be comfortably used by a person who is lying on their back or positioned in any manner including being seated upright.

2. Description of the Prior Art

The use of support devices is known in the prior art. U.S. Pat. No. 5,971,343 describes a book support device for supporting a book in a vertical orientation. Another type of support device is U.S. Pat. No. 6,021,535 having a configuration adapted for holding a keyboard in a generally vertical orientation where the keyboard is electrically coupled to an adjacently positioned computer.

While these devices fulfill their respective, particular objectives and requirements, the need remains for a device that supports a laptop computer in a vertical orientation so that a person lying on their back may use the laptop computer. The device should be adjustable for allowing various angles of support for the laptop and should also be adjustable so that the device is adapted for holding a plurality of differently sized laptops.

SUMMARY OF THE INVENTION

The present invention meets the needs presented above by generally comprising a pair of elongated bases each having a top side, a bottom side, a first end and a second end. A pair of supports is provided. Each of the supports is attached to one of the bases and extends upwardly therefrom. A panel has a front side, a back side, a top edge, a bottom edge, a first side edge and a second side edge. The panel is attached to and extends between the supports so that the supports are spaced from each other. The front side of the panel has a plurality of apertures extending therethrough. A pair of clips is provided. Each of the clips is selectively positionable in one of the apertures. Each of a pair of rods includes a loop attached thereto. The rods are each extendable through the apertures so that the loops extend away from the front side of the panel. A tether has a pair of ends. Each of a pair of hooks is attached to one of the ends of the tether and each of the hooks is releasably securable to one of the loops. The tether is resiliently stretchable. A laptop computer is positionable on the clips and the tether positioned across the laptop computer so that the laptop computer is secured to the panel and supported above the bases.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
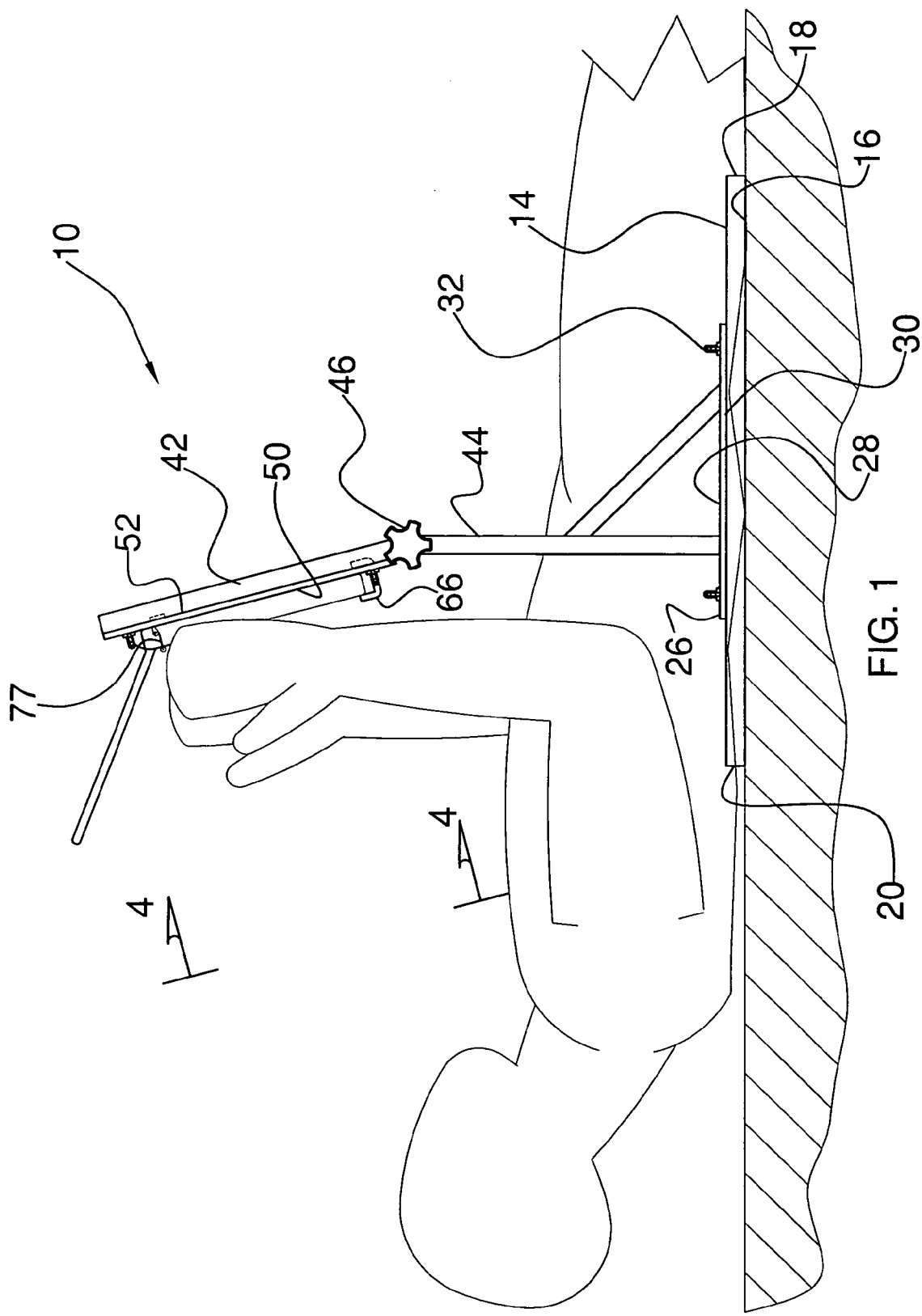
FIG. 1 is a side in-use view of a laptop support assembly according to the present invention.
Figure 3:
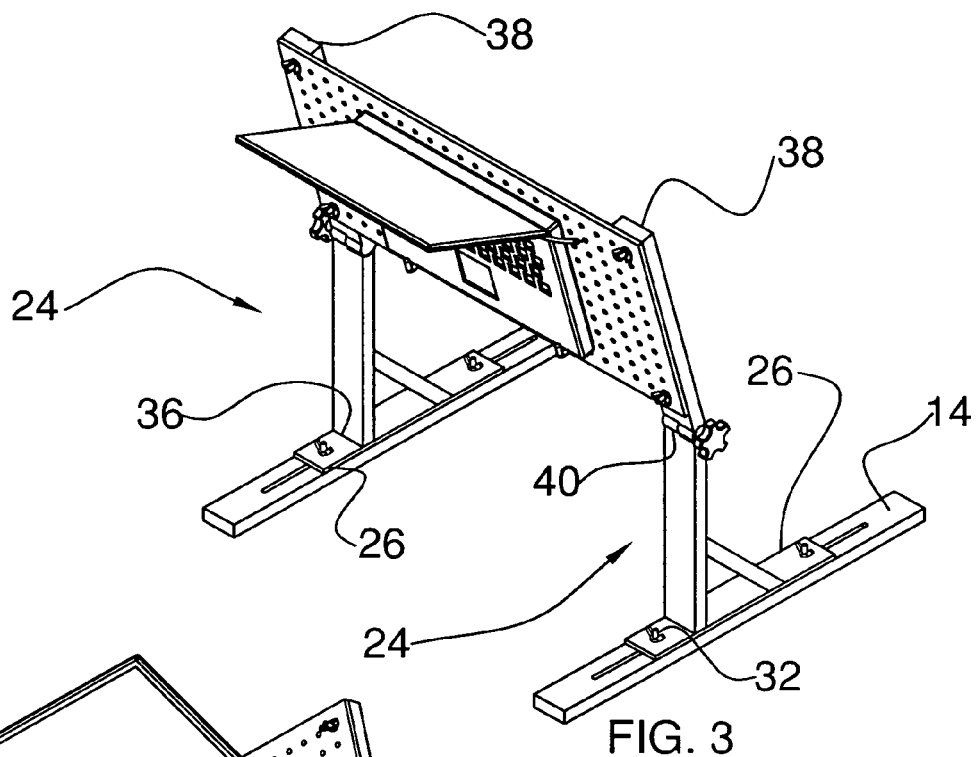
FIG. 3 is a top perspective view of the present invention.
Figure 2:
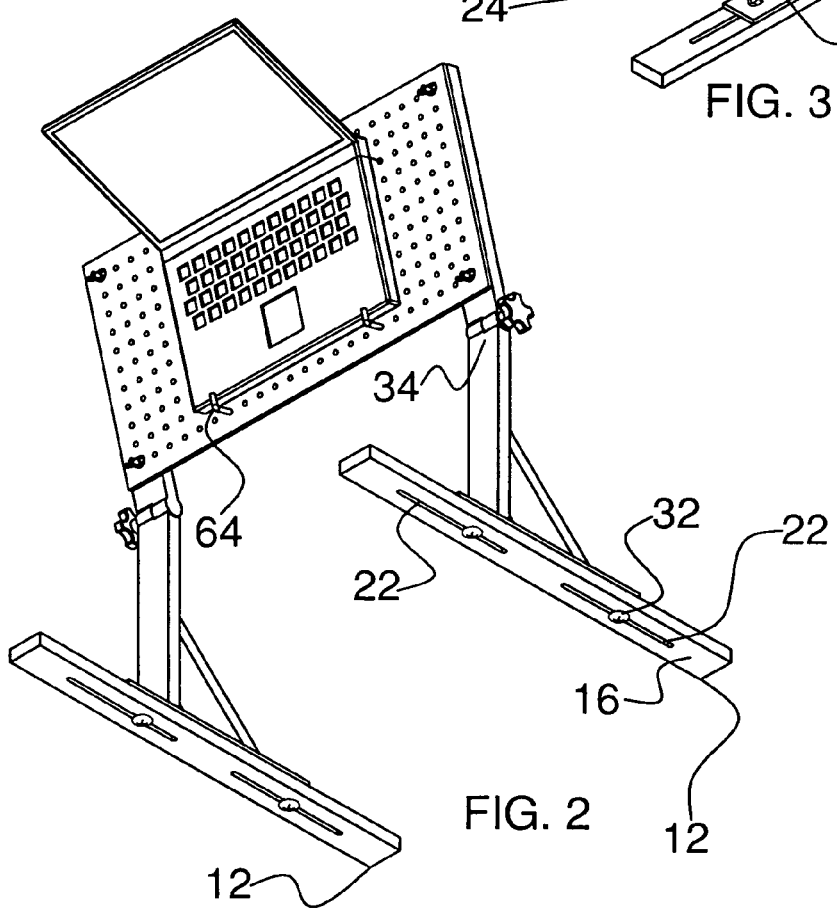
FIG. 2 is a bottom perspective view of the present invention.
Figure 4:
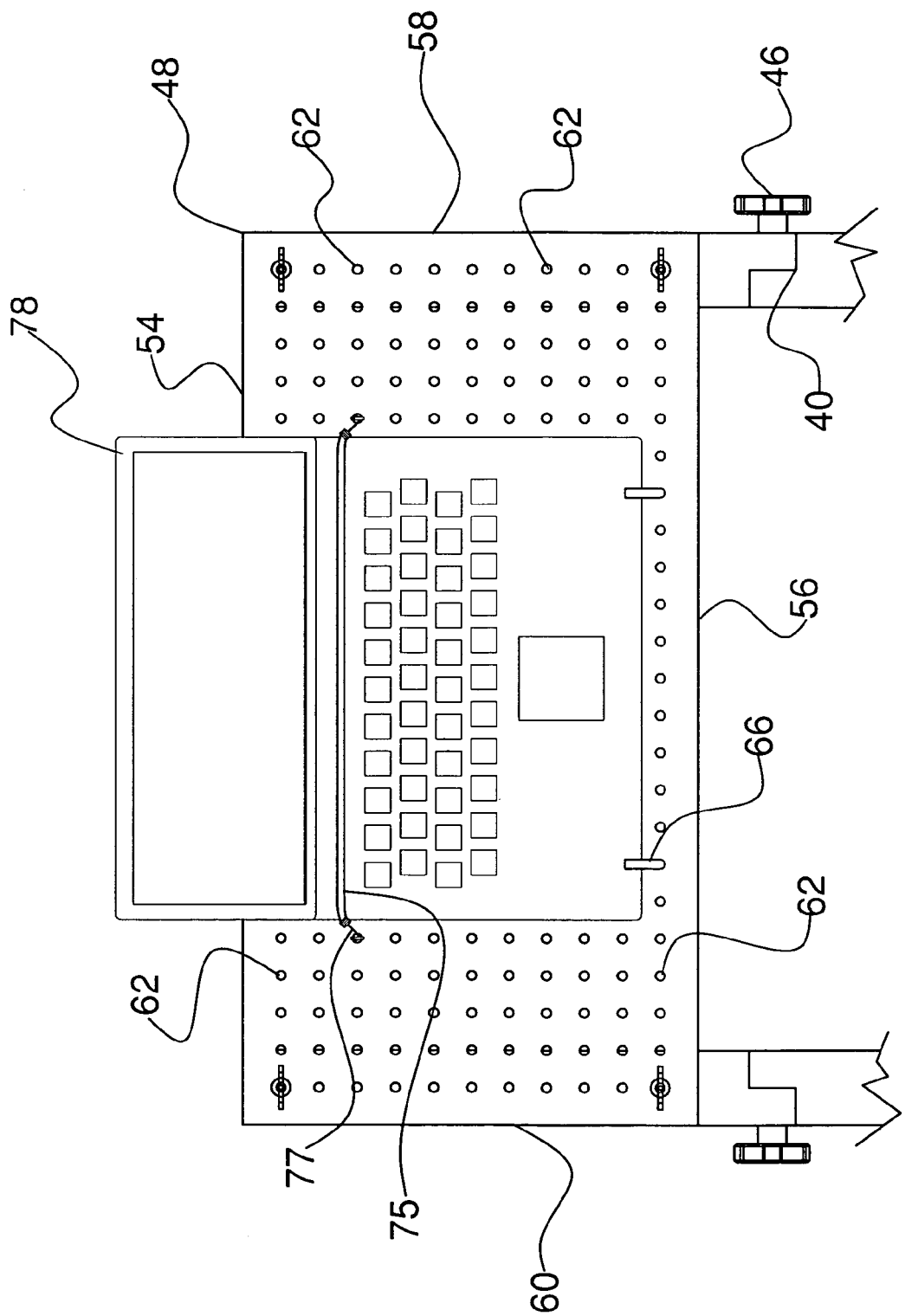
FIG. 4 is a front view of the present invention.
Figure 5:
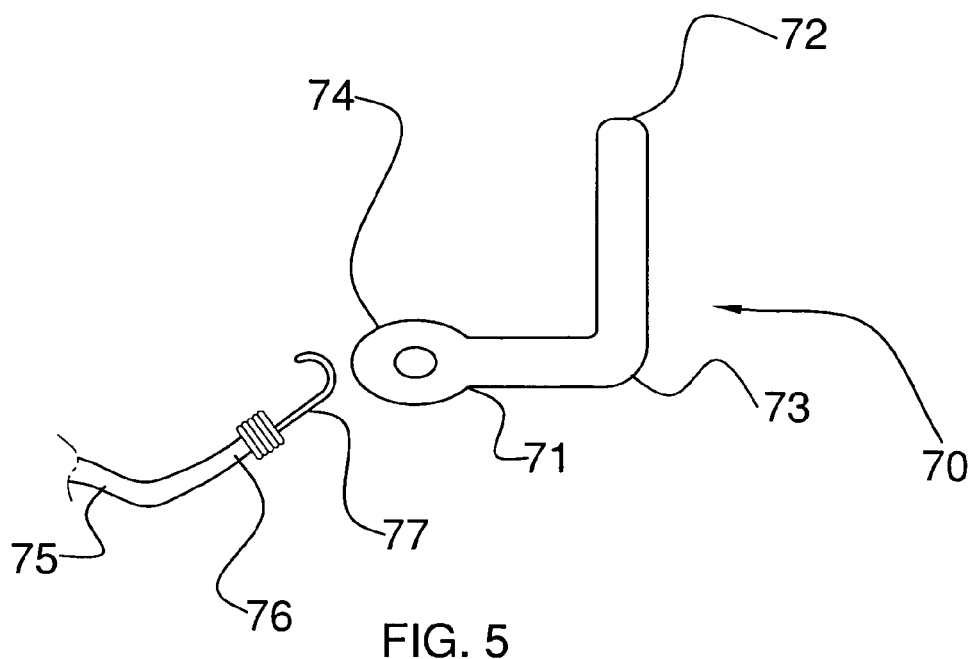
FIG. 5 is a side view of a rod and loop of the present invention.
Figure 6:
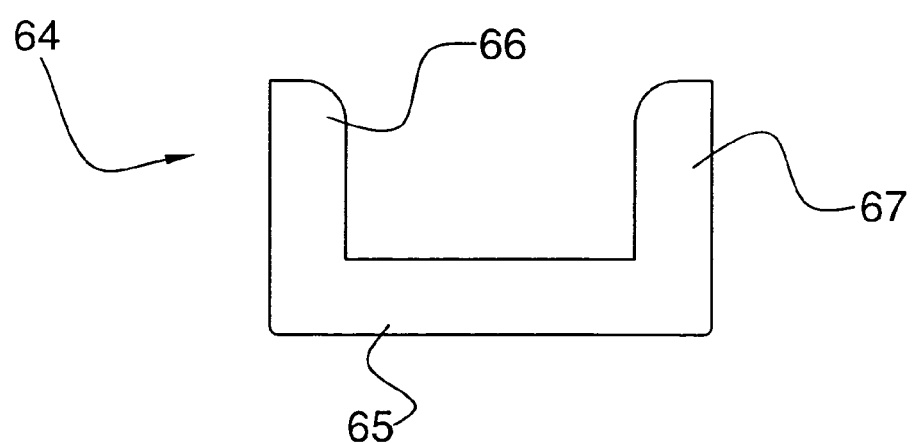
FIG. 6 is a side view of a clip of the present invention.

With reference now to the drawings, and in particular to FIGS. 1 through 6 thereof, a new laptop support device embodying the principles and concepts of the present invention and generally designated by the reference numeral 10 will be described.

As best illustrated in FIGS. 1 through 6, the laptop support assembly 10 generally comprises a pair of elongated bases 12 each having a top side 14, a bottom side 16, a first end 18 and a second end 20. Each of the bases 12 has a pair of elongated slots 22 therein extending through the top 14 and bottom 16 sides. The slots 22 are aligned with each other and extend along a longitudinal axis of a respective one of the bases 12. Each of the bases 12 has a length generally between 12 inches and 24 inches, a width generally between 2 inches and 4 inches and a height generally between ½ inch and 2 inches.

A pair of supports 24 is provided. Each of the supports 24 is attached to one of the bases 12 and extends upwardly therefrom. Each of the supports 24 includes a plate 26 that has an upper surface 28 and a lower surface 30. The lower surface 30 is abutted against one of the top sides 14 of the bases 12. A pair of fasteners 32 extends through the plate 26 and each extends into one of the slots 22 of a respective one of the bases 12. The slots 22 allow a person to selectively move the plate 26 along a respective one of the bases 12. A leg 34 has a bottom end 36 and a top end 38. Each of the bottom ends 36 is attached to the upper surface 28 of the plate 26. The leg 34 has a break 40 therein so that an upper portion 42 and a lower portion 44 of the leg 34 are defined. The upper portion 42 is hingedly coupled to the lower portion 44 and a securing member 46, such as a threaded fastener, is configured to releasably lock the upper portion 42 at a selectable angle with respect to the lower portion 44.

A panel 48 has a front side 50, a back side 52, a top edge 54, a bottom edge 56, a first side edge 58 and a second side edge 60. The panel 48 is attached to and extends between the supports 24 so that the supports 24 are spaced from each other. The front side 50 of the panel 48 has a plurality of apertures 62 extending therethrough. The apertures 62 are aligned in rows and columns on the panel 48. Each of the upper portions 42 of the legs 34 abuts the back side 52. Each of the upper portions 42 is positioned adjacent to and extends along a length of a corresponding one of the first 58 and second 60 side edges.

A pair of clips 64 is provided. Each of the clips 64 comprises a central member 65, a first arm 66 and a second arm 67. Each of the first 66 and second 67 arms is attached to one of a pair of opposite ends of the central member 65. The first 66 and second 67 arms are orientated perpendicular to an attached one of the central members 65. Each of the central members 65 is selectively positionable in one of the apertures 62 so that the first arms 66 are positioned adjacent to the front side 50 and the second arms 67 are positioned adjacent to the back side 52.

A pair of rods 70 is also provided. The rods 70 each have a first end 71, a second end 72 and a bend 73 positioned between the first 71 and second 72 ends of the rods 70. Each of a pair of loops 74 is attached to one of the first ends 71 of the rods 70. The second ends 72 of the rods 70 are extendable through of the apertures 62 so that the loops 74 extend away from the front side 50 of the panel 48. A tether 75 has a pair of ends 76 and each of a pair of hooks 77 is attached to one of the ends 76 of the tether 75. Each of the hooks 77 is releasably securable to one of the loops 74. The tether 75 is resiliently stretchable.

In use, a laptop computer 78 is positionable on the clips 64 so that it is supported vertically on the clips 64. The tether 75 is then positioned across the laptop computer 78 so that the laptop computer 78 is secured to and biased against the panel 48. In this manner, the laptop computer 78 is supported above the bases 12. The tether 75 and clips 64 allow the laptop to be moved beyond a vertical orientation as is shown in FIG. 1 to ensure that a user of the assembly 10 will be comfortable regardless of their orientation. The ability to move the supports 24 with respect to the bases 12 will also allow a user to adjust the center of gravity of the assembly 10 when a laptop computer 78 is attached to the panel 48. The apertures 62 allow a person to adjust the positioning of the clips 64 and rods 70 so that variously sized laptops 68 may be attached to the panel. The apertures 62 also provide airflow for the laptop to prevent overheating of the laptop computer 78.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A laptop computer support assembly comprising:
a pair of elongated bases each having a top side, a bottom side, a first end and a second end;
a pair of supports, each of said supports being attached to one of said bases and extending upwardly therefrom;
a panel having a front side, a back side, a top edge, a bottom edge, a first side edge and a second side edge, said panel being attached to and extending between said supports such that said supports are spaced from each other, said front side of said panel having a plurality of apertures extending therethrough;
a pair of clips, each of said clips being selectively positionable in one of said apertures;
a pair of rods each having a loop attached thereto, each of said rods being extendable through of said apertures such that said loops extend away from said front side of said panel;
a tether having a pair of ends, a pair of hooks, each of said hooks being attached to one of said ends of said tether, each of said hooks being releasably securable to one of said loops, said tether being resiliently stretchable; and
wherein a laptop computer is positionable on said clips and said tether positioned across the laptop computer such that the laptop computer is secured to the panel and supported above said bases.

2. The assembly according to claim 1, further including:
each of said bases having a pair of elongated slots therein extending through said top and bottom sides, said slots being aligned with each other and extending along a longitudinal axis of a respective one of said bases,
each of said supports including;
a plate having an upper surface and a lower surface, said lower surface being abutted against one of said top sides of said bases;
a pair of fasteners extending through said plate, each of said fasteners extending into one of said slots of a respective one of said bases; and
a leg having a bottom end and a top end, each of said bottom ends being attached to said upper surface.

3. The assembly according to claim 2, wherein said leg has a break therein so that an upper portion and a lower portion of said leg is defined, said upper portion being hingedly coupled to said lower portion, a securing member being configured to releasably lock said upper portion at a selectable angle with respect to said lower portion, each of said upper portions of said legs abutting said back side, each of said upper portions being positioned adjacent to and extending along a length of a corresponding one of said first and second side edges.

4. The assembly according to claim 1, wherein each of said bases has a length generally between 12 inches and 24 inches, a width generally between 2 inches and 4 inches and a height generally between ½ inch and 2 inches.

5. The assembly according to claim 1, wherein said apertures are aligned in rows and columns on said panel.

6. The assembly according to claim 1, wherein each of said clips comprises a central member, a first arm and a second arm, each of said first and second arms being attached to one of a pair of opposite ends of said central member, said first and second arms being orientated perpendicular to an attached one of said central members, each of said central members being selectively positionable in one of said apertures such that said first arms are positioned adjacent to said front side and said second arms are positioned adjacent to said back side.

7. A laptop computer support assembly comprising:
a pair of elongated bases each having a top side, a bottom side, a first end and a second end, each of said bases having a pair of elongated slots therein extending through said top and bottom sides, said slots being aligned with each other and extending along a longitudinal axis of a respective one of said bases, each of said bases having a length generally between 12 inches and 24 inches, a width generally between 2 inches and 4 inches and a height generally between ½ inch and 2 inches;
a pair of supports, each of said supports being attached to one of said bases and extending upwardly therefrom, each of said supports including;
a plate having an upper surface and a lower surface, said lower surface being abutted against one of said top sides of said bases;
a pair of fasteners extending through said plate, each of said fasteners extending into one of said slots of a respective one of said bases;

a leg having a bottom end and a top end, each of said bottom ends being attached to said upper surface, said leg having a break therein such that an upper portion and a lower portion of said leg is defined, said upper portion being hingedly coupled to said lower portion, a securing member being configured to releasably lock said upper portion at a selectable angle with respect to said lower portion;

a panel having a front side, a back side, a top edge, a bottom edge, a first side edge and a second side edge, said panel being attached to and extending between said supports such that said supports are spaced from each other, said front side of said panel having a plurality of apertures extending therethrough, said apertures being aligned in rows and columns on said panel, each of said upper portions of said legs abutting said back side, each of said upper portions being positioned adjacent to and extending along a length of a corresponding one of said first and second side edges;

a pair of clips, each of said clips comprising a central member, a first arm and a second arm, each of said first and second arms being attached to one of a pair of opposite ends of said central member, said first and second arms being orientated perpendicular to an attached one of said central members, each of said central members being selectively positionable in one of said apertures such that said first arms are positioned adjacent to said front side and said second arms are positioned adjacent to said back side;

a pair of rods each having a first end, a second end and a bend positioned between said first and second ends of said rods, a pair of loops, each of said loops being attached to one of said first ends of said rods, each of said second ends of said rods being extendable through of said apertures such that said loops extend away from said front side of said panel;

a tether having a pair of ends, a pair of hooks, each of said hooks being attached to one of said ends of said tether, each of said hooks being releasably securable to one of said loops, said tether being resiliently stretchable; and wherein a laptop computer is positionable on said clips and said tether positioned across the laptop computer such that the laptop computer is secured to the panel and supported above said bases.

* * * * *